United States Patent [19]

Ninomiya

[11] Patent Number: 5,363,312
[45] Date of Patent: Nov. 8, 1994

[54] METHOD AND APPARATUS FOR BATTERY CONTROL

[75] Inventor: Ryozi Ninomiya, Tokyo, Japan

[73] Assignee: Kabushiki Kaisha Toshiba, Kawasaki, Japan

[21] Appl. No.: 29,967

[22] Filed: Mar. 9, 1993

Related U.S. Application Data

[63] Continuation of Ser. No. 967,540, Oct. 27, 1992, abandoned, which is a continuation of Ser. No. 853,017, Mar. 18, 1992, abandoned, which is a continuation of Ser. No. 578,225, Sep. 6, 1990, abandoned.

[30] Foreign Application Priority Data

Mar. 30, 1990 [JP] Japan .................... 2-84651

[51] Int. Cl.⁵ ............................. H02J 7/00; G06F 15/20
[52] U.S. Cl. ....................................... 364/483; 320/38; 320/48; 340/636; 364/481
[58] Field of Search ................ 320/2, 38, 40, 48, 20, 320/37, 30, 32; 364/481, 483, 571.01, 571.03, 571.07; 324/431, 433, 430, 434; 340/636, 660, 661, 662, 663

[56] References Cited

U.S. PATENT DOCUMENTS

| | | | |
|---|---|---|---|
| 4,553,081 | 11/1985 | Koenck | 320/48 |
| 4,562,398 | 12/1985 | Kotlarewsky | 320/38 X |
| 4,595,872 | 6/1986 | Ball | 320/48 |
| 4,649,333 | 3/1987 | Moore | 320/39 |
| 4,673,862 | 6/1987 | Wahlström | 320/48 |
| 4,707,183 | 3/1990 | Tanaka | . |
| 4,742,290 | 5/1988 | Sutphin et al. | 320/21 |
| 4,849,700 | 7/1989 | Morioka et al. | . |
| 4,876,513 | 10/1989 | Brilmyer et al. | 320/48 |
| 4,961,043 | 10/1990 | Koenck | 320/40 |
| 4,965,738 | 10/1990 | Bauer et al. | 320/48 |
| 4,983,904 | 1/1991 | Iwahashi | 320/38 X |
| 5,012,176 | 4/1991 | LaForge | 320/48 |
| 5,057,762 | 10/1991 | Goedken et al. | 320/2 X |
| 5,075,614 | 12/1991 | Whiting | 320/38 X |
| 5,118,962 | 6/1992 | Ishii et al. | . |

FOREIGN PATENT DOCUMENTS 0288013 10/1988 European Pat. Off. .
0335316 10/1989 European Pat. Off. .

Primary Examiner—Kevin J. Teska
Attorney, Agent, or Firm—Finnegan, Henderson, Farabow, Garrett & Dunner

[57] ABSTRACT

In a power supply control apparatus capable of connecting an AC adapter, it is determined by a controller whether or not the AC adapter is connected. When a battery is set in the apparatus, it is determined whether the battery is in a low battery state. When the AC adapter is connected and the set battery is in a low battery state, charge operation for the battery is started. During charging, a charged state is monitored on the basis of the current value detected by a current detector and a charge time measured by a timer. When the charge amount exceeds a predetermined amount, or the charge time exceeds a predetermined charge time, the charge operation is completed and the battery is used as a power supply.

30 Claims, 2 Drawing Sheets

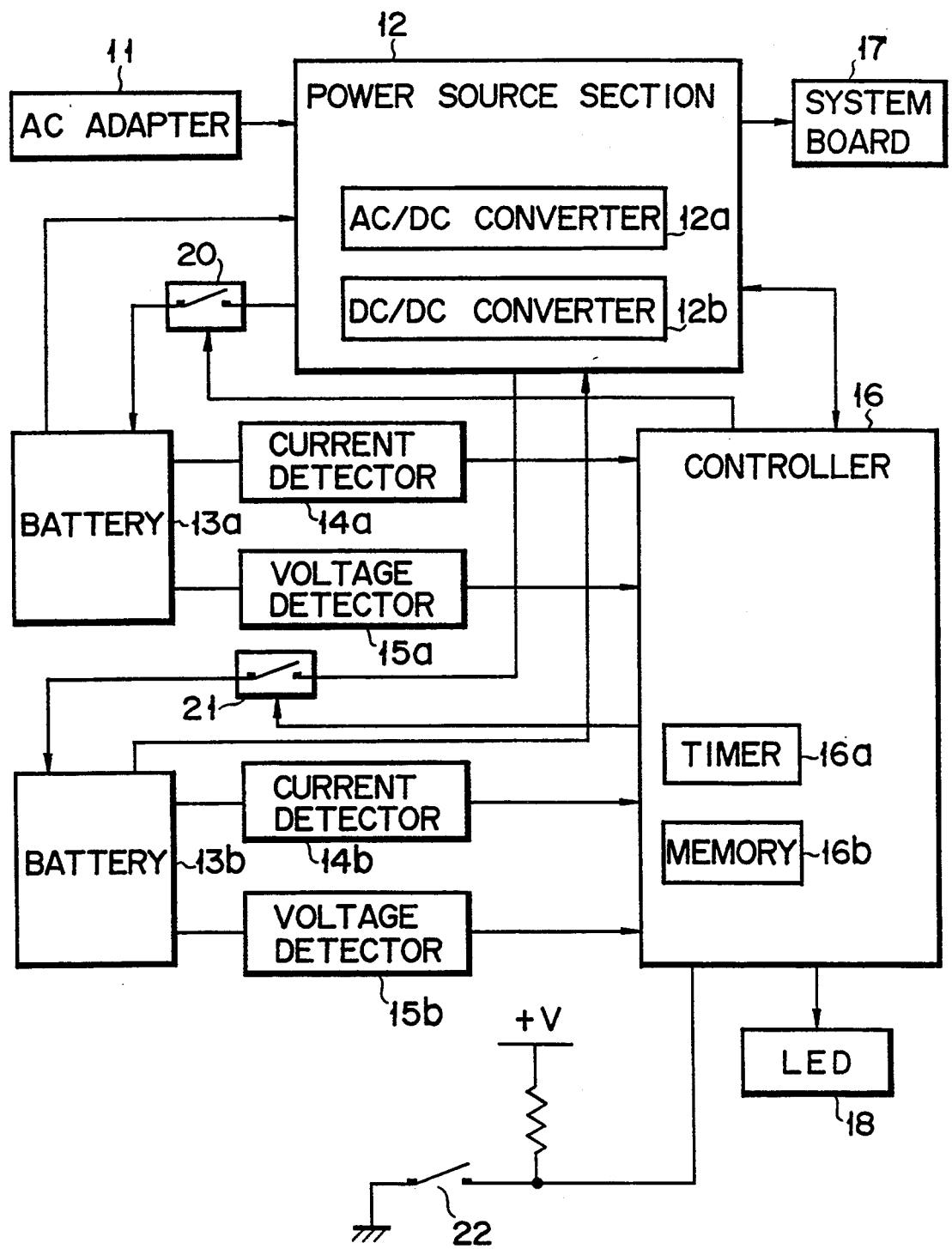
F I G. 1

METHOD AND APPARATUS FOR BATTERY CONTROL

This application is a continuation of application Ser. No. 07/967,540 filed Oct. 27, 1992 for METHOD AND APPARATUS FOR BATTERY CONTROL, which is a continuation of patent application Ser. No. 07/853,017 filed Mar. 18, 1992, which is a continuation of patent application Ser. No. 07/578,225, filed Sep. 6, 1990 and now all abandoned.

BACKGROUND OF THE INVENTION

1. Field of the Invention

The present invention relates to a method and an apparatus for battery control.

2. Description of the Related Art

In a field of personal computers, compact, lightweight, and portable laptop type personal computers have been popular in place of desktop type personal computers.

Most of the laptop type personal computers are driven by batteries or by both the batteries and AC adapters. When an A/C adapter is connected to a computer, the computer is driven by power supplied from the A/C adapter, and the battery is charged by the power. On the other hand, when the A/C adapter is not connected to the computer, the computer is driven by power supplied from the battery. Note that control operations for these power supplies are performed by a power supply controller.

The power supply controller monitors a battery voltage of a battery used for supplying the power. When the monitored battery voltage reaches such a voltage where enough power for operating the computer cannot be supplied, it is determined that the battery is in a low battery state, and the battery is not used any longer. In addition, when the battery voltage reaches a voltage slightly higher than the voltage of the low battery state, the power supply controller generates an alarm to inform a user that the battery capacity is decreased.

Conventionally, when the battery in the low battery state is charged even within a short time, the power supply controller determines that the battery is not in the low battery state, and performs power supply control for the battery.

when the charged battery is used after the battery in the low battery state is charged within a short-time, however, the battery voltage is suddenly decreased to be in the low battery state soon after the use of the battery. As a result, power supply of the computer is turned off without generating the above described alarm. In addition, in a computer having a resume function, the power supply of the computer is turned off before completion of the resume operation. Therefore, the resume function is not sufficiently utilized.

As described above, a demand has arisen for a power supply control apparatus capable of using the battery after sufficient charging of the battery in the low battery state.

SUMMARY OF THE INVENTION

It is an object of the present invention to provide a method and apparatus for a battery control.

According to one aspect of the present invention, there is provided a battery control method comprising the steps of:

checking whether or not at least one battery to be set is in a low battery state;

charging the set battery when the set battery is in the low battery state;

obtaining a charge period of the set battery;

detecting a charge amount of the set battery; and determining whether or not a desired charge amount for the set battery is obtained in accordance with at least one of the detected charge amount and the obtained charge period.

According to another aspect of the present invention, there is provided a battery control apparatus comprising:

at least one battery to be set;

an AC adapter;

checking means for checking whether or not the set battery is in a low battery state;

charging means for charging the set battery by the AC adapter when the set battery is in the low battery state;

obtaining means for obtaining a charge period of the set battery;

detecting means for detecting a charge amount of the set battery; and determining means for determining whether or not a desired charge amount for the set battery is obtained in accordance with at least one of the detected charge amount and the obtained charge period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram showing an arrangement of a power supply control system of an embodiment of the present invention.

DETAILED DESCRIPTION OF THE PREFERRED EMBODIMENT

Figure 2:
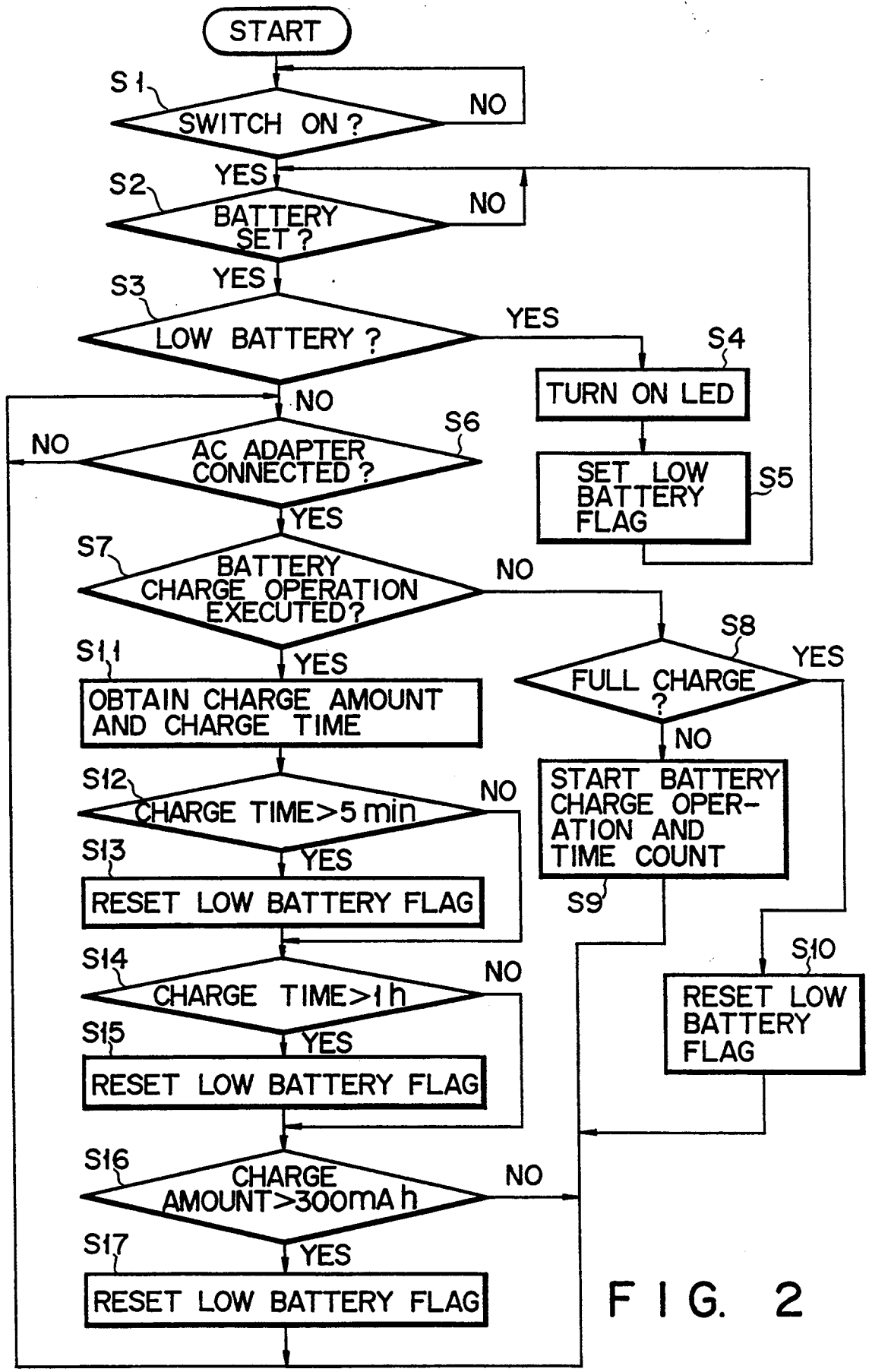
Fig. 2 is a power supply control flow chart in the power supply control system.

An embodiment of the present invention will be described in detail with reference to the accompanying drawings.

In FIG. 1, a power supply control system of the embodiment comprises an AC adapter 11, a power supply section 12, batteries 13a and 13b, current detectors 14a and 14b, voltage detectors 15a and 15b, a controller 16, a system board 17, an LED (light emitting diode) 18, and switches 20, 21, and 22.

The AC adapter 11 is used for supplying an AC voltage to the power supply section 12.

The power supply section 12 comprises an AC/DC converter 12a and a DC/DC converter 12b, and supplies a predetermined DC voltage to the system board 17. Note that, when the AC adapter 11 is connected to the power supply section 12, and the batteries 13a and 13b are in a low battery state, a charge current is supplied to the batteries 13a and 13b from the power supply section 12 through the switches 20 and 21, respectively.

The batteries 13a and 13b are used as chargeable power supplies for supplying the DC voltage to the power supply section 12.

The current detectors 14a and 14b detect charge currents and discharge currents at the batteries 13a and 13b and output the detected current values to the controller 16.

The voltage detectors 15a and 15b detect battery voltages of the batteries 13a and 13b and output the detected voltage values to the controller 16.

The controller 16 comprises a timer 16a and a memory 16b, and controls the power supply section 12, the switches 20 and 21, and the LED 18. Note that the timer 16a is used for measuring a charge time. In the memory 16b, a low battery flag indicating whether or not the batteries 13a and 13b are in the low battery state is set.

The system board 17 is used for operating a computer system (not shown).

A power supply control operation in the power supply control system will be described with reference to a flow chart in FIG. 2.

It is determined in step S1 whether or not the switch 22 is turned on. That is, as shown in FIG. 1, since a voltage V is supplied to the controller 16, it is determined that the switch 22 is turned on when the voltage V becomes zero.

When the switch 22 is turned on in step S1, it is determined whether or not the battery is set in the embodiment system (step S2). In the system, two batteries 13a and 13b are used. When at least one battery is set in the system, it is determined whether or not the battery is in the low battery state (step S3). Note that the determination whether or not the battery is set in the system is, for example, performed on the basis of voltage values detected by the voltage detector 15a and 15b. In addition, determination whether or not the batteries set in the system are in the low battery state is, for example, performed on the basis of current values detected by the current detectors 14a and 14b.

When the battery set in the system is in the low battery state in step S3, the LED 18 is turned on (step S4), and a low battery flag indicating the low battery state is set (step S5). In this system, low battery flags (not shown) corresponding to two batteries 13a and 13b are arranged. As a result, for example, when two batteries are set in the system and both the batteries are in the low battery state, the low battery flags corresponding to the batteries are set, and the process in step S2 is executed again.

When the battery set in the system is not in the low battery state in step S3, it is determined whether or not the AC adapter 11 is connected to the power supply section 12 (step S6). More specifically, for example, when two batteries are set in the system and at least one battery is not in the low battery state, the process in step S6 is executed. Note that the low battery flag corresponding to the battery in the low battery state is set.

When the AC adapter 11 is connected to the power supply section 12 in step S6, it is determined whether or not battery charge operation is performed for the battery set in the system (step S7).

When the battery charge operation is not executed in step S7, it is determined whether or not the battery set in the system is fully charged (step S8). When the battery is fully charged in step S8, the low battery flag corresponding to the fully charged battery is reset (step S10) and the LED 18 is turned off. On the other hand, when the battery is not fully charged, the battery charge operation is started, and a time count by the timer 16a is started (step S9).

When the battery charge operation is executed in step S7, a charge amount and a charge time of the battery are obtained (step S11). Note that, the charge time is obtained on the basis of the time count value of the timer 16a, and the charge amount is obtained on the basis of the current values detected by the current detectors 14a and 14b, and the time count value.

It is determined in step S12 whether or not the charge time of the battery exceeds a rapid charge time, for example, five minutes. When the charge time exceeds five minutes, it is determined that a sufficient charge amount for using the battery is obtained, and the low battery flag is reset (step S13), the LED 18 is turned off, and the battery charge operation for the battery is completed.

It is determined in step S14 whether or not the charge time of the battery exceeds a normal charge time, for example, one hour. When the charge time exceeds one hour, it is determined that the sufficient charge amount for using the battery is obtained, and the low battery flag is reset (step S15). In addition, the LED 18 is turned off, and the battery charge operation for the battery is completed.

When charge amount of the battery exceeds a predetermined charge amount, for example, 300 (mA h) in step S16, it is determined that the sufficient charge amount for using the battery is obtained, and the low battery flag is reset (step S17). In addition, the LED 18 is turned off, and the battery charge operation for the battery is completed.

By the operation described above, the battery charge is performed until the battery set in the system obtains a predetermined charge amount.

Note that, when a battery enters the low battery state while using the battery, the corresponding battery flag is set, and the supply of a voltage from the battery with the low battery state to the power supply section 12 is stopped. When the AC adapter 11 is connected to the power supply section 12, the above-described battery charge operation for the battery with the low battery state is performed.

As described above, according to the system of the embodiment, when a battery set in the system is in a low battery state, the battery is not used until the battery obtains a predetermined charge amount. As a result, it can be prevented that the battery enters the low battery state soon after the use of the battery and the system power supply is turned off. In addition, in a computer having a resume function, it can be prevented that the system power supply is turned off before the resume process is completed.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A battery power supply control apparatus for controlling power supply of a battery set in the apparatus, the apparatus comprising:
   a controller;
   checking means, operatively communicating with the set battery and the controller, for checking whether or not a charge amount of the set battery is in a low state;
   charging means, controlled by the controller, for charging the set battery when the checking means communicates to the controller that the charge amount of the set battery is in the low state;
   timer means, operatively communicating with the controller, for starting a time count value when the charging means commences charging the set battery; and
   determining means, operatively communicating with the controller, for determining whether or not the time count value exceeds a desired time value, the controller stopping the charging means from charging the set battery in response to a predetermined count of the time count value communicated by the determining means.

2. The apparatus according to claim 1, wherein the determining means further determines whether or not a desired charge amount for the set battery is obtained, the controller stopping the charging means from charging the set battery when the determining means communicates to the controller that the desired charge amount is obtained.

3. The apparatus according to claim 1, further comprising establishing means, operatively communicating with the controller, for establishing that the set battery is set in the apparatus prior to the checking means checking whether or not the charge amount of the set battery is in the low state.

4. The apparatus according to claim 1, wherein the predetermined count of the time count value is when the time count value is determined to exceed at least a first time value corresponding to a rapid time charge.

5. The apparatus according to claim 4, wherein the predetermined count of the time count value is when the time count value is determined to exceed a second time value of greater duration than the first time value, the second time value corresponding to a normal charge time.

6. A battery power supply control method for controlling power supply of at least one battery, the method comprising the steps of:
   checking whether or not a charge amount of the at least one battery is in a low state;
   charging the at least one battery when the charge amount of the at least one battery is checked to be in the low state;
   starting a time count value when the charging of the at least one battery commences;
   determining whether or not the time count value exceeds a desired time value; and
   stopping the charging of the at least one battery in response to a predetermined count of the time count value.

7. The method according to claim 6, wherein the predetermined count of the time count value is when the time count value is determined to exceed the desired time value.

8. The method according to claim 6, wherein the determining step further includes the step of determining whether or not a desired charge amount for the at least one battery is obtained; and
   the stopping step comprises stopping the charging of the at least one battery either in response to the predetermined count of the time count value or when the desired charge amount is obtained.

9. A battery power supply control apparatus for controlling power supply of a battery set in the apparatus, the apparatus comprising:
   a power source, coupled to the set battery, for supplying power from the set battery to a load;
   checking means, coupled to the set battery, for checking whether or not a charge amount of the set battery is in a low state;
   charging means for charging the set battery when the checking means indicates that the charge amount of the set battery is in the low state;
   timer means for starting a time count value when the charging means commences charging the set battery, said charging means stopping charging of the set battery in response to a predetermined count of the time count value; and
   control means, coupled to the checking means, for inhibiting the power source from supplying power from the set battery to the load until at least one of the charge amount of the battery and the time count value from said timer means reaches a predetermined value.

10. The apparatus according to claim 9, further comprising:
    timer means for starting a time count value when the charging means commences charging the set battery,
    wherein the control means inhibits the power source from supplying power from the set battery to the load until the charge amount of the battery reaches the predetermined value and the time count value reaches a predetermined count.

11. The apparatus according to claim 10, wherein the control means stops the charging means from charging the set battery when the time count value reaches the predetermined count.

12. The apparatus according to claim 11, wherein the predetermined count of the time count value is when the time count value reaches a first time value corresponding to a rapid time charge.

13. The apparatus according to claim 11, wherein the predetermined count of the time count value is when the time count value reaches a desired time value.

14. A battery power supply control apparatus for controlling power supply of a battery set in the apparatus, the apparatus comprising:
    a power source, coupled to the set battery, for supplying power to a load;
    charging means for charging the set battery when the charge amount of the set battery is in the low state; and
    a controller for detecting whether a charge amount of the set battery is in a low state, for starting a time count value in timer means When the charging means commences charging the set battery, said charging means stopping charging of the set battery in response to a predetermined count of the time count value, and for inhibiting the power source from supplying power from the set battery to the load until at least one of the charge amount of the battery and the time count value from said timer means reaches a predetermined value.

15. The apparatus according to claim 14, further comprising:
   timer means for starting a time count value when the charging means commences charging the set battery,
   wherein the controller inhibits the power source from supplying power from the set battery to the load until the charge amount of the battery reaches the predetermined value and the time count value reaches a predetermined count.

16. The apparatus according to claim 15, wherein the predetermined count of the time count value is when the time count value reaches a first time value corresponding to a rapid time charge.

17. The apparatus according to claim 15, wherein the predetermined count of the time count value is when the time count value reaches a desired time value.

18. The apparatus according to claim 15, wherein the controller stops the charging means from charging the set battery when the time count value reaches the predetermined count.

19. A computer having a system board, comprising:
   a battery;
   a power source, coupled to the battery, for supplying power from the battery to the system board;
   charging means for charging the battery when a charge amount of the battery is in a low state;
   timer means for starting a time count value when the charging means commences charging the battery, said charging means stopping charging of the battery in response to a predetermined count of the time count value; and
   a controller for detecting whether a charge amount of the battery is in the low state, and for inhibiting the power source from supplying power from the battery to the system board until at least one of the charge amount of the battery and the time count value reaches a predetermined value.

20. The computer according to claim 19, further comprising:
   timer means for starting a time count value when the charging means commences charging the battery,
   wherein the controller inhibits the power source from supplying power from the battery to the system board until the charge amount of the battery reaches the predetermined value and the time count value reaches a predetermined count.

21. A portable computer having a system board, comprising:
   a battery set in the portable computer;
   a power source, coupled to the set battery, for supplying power to the system board;
   detecting means for detecting whether or not a charge amount of the set battery is in a low state;
   charging means for charging the set battery when the detecting means indicates that the charge amount of the set battery is in the low state;
   timer means for starting a time count value when the charging means commences charging the set battery, said charging means stopping charging of the set battery in response to a predetermined count of the time count value; and
   control means for inhibiting, when the detecting means detects that the charge amount of the battery is in a low state, the power source from supplying power from the set battery to the system until at least one of the charge amount of the set battery and the time count value reaches a predetermined value.

22. A battery power supply control apparatus for controlling power supply of a battery set in the apparatus, the apparatus comprising:
   a power source, coupled to the set battery, for supplying power to a load;
   detecting means for detecting whether or not a charge amount of the set battery is in a low state;
   charging means for charging the set battery when the detecting means detects that the charge amount of the set battery is in the low state; and
   control means for inhibiting the power source from supplying power from the set battery to the load until the charge amount of the battery reaches a predetermined value.

23. A battery power supply control apparatus for controlling power supply of a battery set in the apparatus, the apparatus comprising:
   a power source, coupled to the set battery, for supplying power to a system board;
   detecting means for detecting whether or not a charge amount of the set battery is in a low state;
   charging means for charging the set battery when the detecting means detects that the charge amount of the set battery is in a low state;
   timer means for starting a time count value when the charging means commences charging the set battery; and
   control means for inhibiting the power source from supplying power from the set battery to the system board until the time count value reaches a predetermined count.

24. The apparatus according to claim 23, wherein the control means stops the charging means from charging the set battery when the time count value reaches the predetermined count.

25. The apparatus according to claim 24, wherein the predetermined count of the time count value is when the time count value reaches a desired time value.

26. A portable computer having a system board, comprising:
   a battery;
   a power source, coupled to the battery, for supplying power to the system board;
   detecting means for detecting whether or not a charge amount of the battery is in a low state;
   charging means for charging the battery when the detecting means detects that the charge amount of the battery is in a low state;
   timer means for starting a time count value when the charging means commences charging the battery; and
   control means for inhibiting the power source from supplying power from the battery to the system board until the time count value reaches a predetermined count.

27. The apparatus according to claim 26, wherein the control means stops the charging means from charging the battery when the time count value reaches the predetermined count condition].

28. The apparatus according to claim 27, wherein the predetermined count of the time count value is when the time count value reaches a desired time value.

29. A battery power supply control apparatus for controlling the power supply of a battery set in the apparatus, the apparatus comprising:

a power source, coupled to the set battery, for supplying power to a load;

charging means for charging the set battery when a charge amount of the set battery is in a low state; and a controller for detecting whether a charge amount of the set battery is in the low state, for monitoring a charge time value of the set battery, and for inhibiting the power source from supplying power from the set battery to the load until at least one of the charge amount of the battery and the charge time value reaches a predetermined value.

30. A battery power supply control apparatus for controlling power supply of a battery set in the apparatus, the apparatus comprising:

a power source, coupled to the set battery, for supplying power from the set battery to a load;

charging means for charging the set battery when a charge amount of the set battery is in a low state;

monitoring means for monitoring a charge time value of the charging means; and a controller for detecting whether a charge amount of the set battery is in a low state, and for inhibiting the power source from supplying power from the set battery to the load until at least one of the charge amount of the battery and the charge time value from the monitoring means reaches a predetermined value.

* * * * *

UNITED STATES PATENT AND TRADEMARK OFFICE
CERTIFICATE OF CORRECTION

PATENT NO. : 5,363,312
DATED : November 08, 1994
INVENTOR(S) : Ryozi Ninomiya

It is certified that error appears in the above-indentified patent and that said Letters Patent is hereby corrected as shown below:

Claim 14, Column 6, Line 60, change "When" to --when--.

Claim 27, Column 8, Line 62, delete "condition]".

Signed and Sealed this

Twenty-sixth Day of March, 1996

Attest:

BRUCE LEHMAN

*Attesting Officer*           *Commissioner of Patents and Trademarks*